May 2, 1950  J. A. DE VILBISS  2,505,949
PRESSURE REGULATOR FOR INFLATABLE BODIES
Filed Jan. 22, 1945
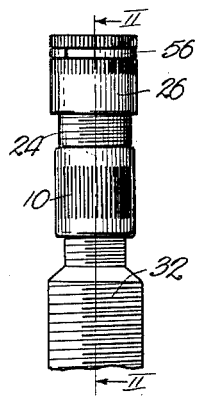
Fig. 1.
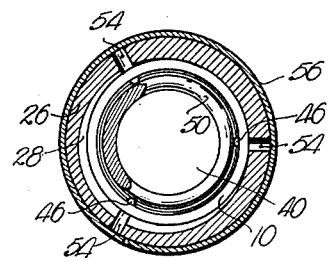
Fig. 3.
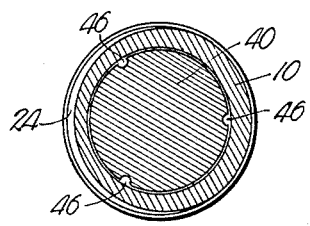
Fig. 4.
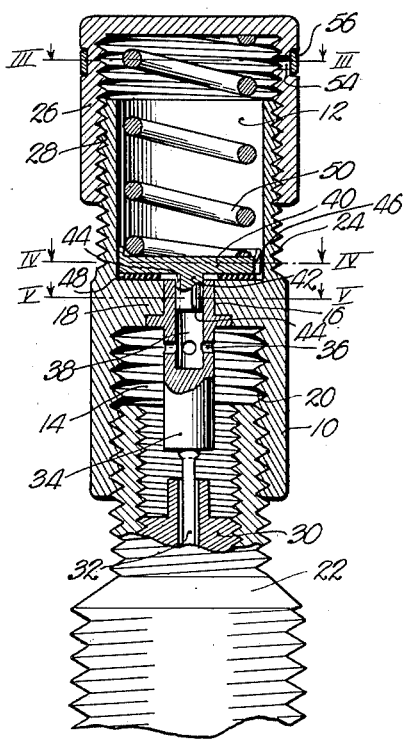
Fig. 2.
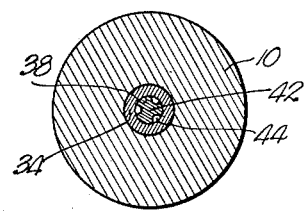
Fig. 5.
INVENTOR.
John A. DeVilbiss
BY
ATTORNEY.

Patented May 2, 1950

2,505,949

UNITED STATES PATENT OFFICE 2,505,949

PRESSURE REGULATOR FOR INFLATABLE BODIES

John A. De Vilbiss, St. Mary, Kans., assignor to Rockhurst College, Kansas City, Mo., a corporation of Missouri Application January 22, 1945, Serial No. 573,944

1 Claim. (Cl. 137—53)

This invention relates to attachments for the valve stems forming parts of inflatable articles and has for a primary aim to provide means for regulating the pressure of air within said articles after the same have been inflated and subjected to action of the elements and to use.

One of the important aims of the instant invention is to provide a pressure regulator for inflatable articles that is attachable to the conventional valve stem which has a valve core including a plunger, the depression whereof serves to open the valve core to allow the escape of air from the article.

Another object of the invention is to provide a pressure regulator of the aforementioned character, that is cheap to manufacture, easy to apply yet embodies manually manipulable parts for varying the pressure to which the regulator will operate when it is mounted upon the conventional valve tube of an inflatable article.

Other objects of the invention including a large number of specific details and the manner of combining the regulator with a valve tube, will appear during the course of the following specification, referring to the accompanying drawing, wherein:

Fig. 1 is a side elevational view of a pressure regulator for inflatable articles embodying the invention and mounted upon a valve tube.

Fig. 2 is an enlarged sectional view taken on line II—II of Fig. 1.

Fig. 3 is a cross sectional view through the cap of the regulator taken on line III—III of Fig. 2 and looking in the direction of the arrows.

Fig. 4 is a cross sectional view taken on line IV—IV of Fig. 2; and

Fig. 5 is another cross sectional view taken on line V—V of Fig. 2.

The relatively small body 10 of the regulator made in accordance with the present invention, is constructed of metal or cast or produced by screw machine methods.

Body 10 has a longitudinal bore therethrough comprising an upper cavity 12, a lower cavity 14, and a relatively small interconnecting passage 16 formed by a partition 18 intermediate the ends of body 10.

Internal threads 20 within cavity 14 engage the upper end of externally threaded valve tube 22 when the regulator is in the operative position.

External threads 24 on the body 10 at the end thereof remote from valve tube 22, removably holds cap 26 in place. The internal threads 28 of cap 26 allow rotation of cap 26 about the axis of body 10 for the purpose more fully hereinafter set forth.

The conventional well-known valve core 30 disposed within valve tube 22, has a plunger 32, which when depressed, will allow the escape of air through valve tube 22 and from the inflatable article with which the tube is joined.

Depressor member 34 formed as illustrated in Fig. 2, is fitted into passage 16 to project longitudinally into cavity 14 a sufficient distance to engage plunger 32 when body 10 is in screw threaded engagement with the end of tube 22. This depressor member has a number of laterally directed passages 36 in connection with a bore 38 formed inwardly from that end of depressor member 34 which fits into passage 16.

A piston assembly including piston head 40 and piston stem 42, is reciprocably mounted within cavity 12 and bore 38 respectively. Grooves 44 in piston stem 42 are milled to a depth great enough to allow free passage of all air that might enter bore 38 through passages 36. Piston head 40 is substantially the same diameter as the diameter of cavity 12 and notches 46 therein insure the escape of air as will be later described.

A gasket 48 between the inner or lower face of piston head 40 and the proximal face of partition 18, precludes the escape of air when the piston is held in the closed position by a coil spring 50. This spring 50 is in cavity 12, has one end against the upper face of piston head 40 while the opposite end thereof is against the inner side of the top or end wall of the cup-shaped cap 26.

Cap 26 is provided with a number of lateral outlet ports 52 terminating at their outer ends in an annular groove 54. A dust ring 56 mounted within this groove 54 covers the several outlet ports 52 but since this ring 56 is split as shown in Fig. 3, and further since it is weak enough to be manipulated by the pressure of air passing outwardly through outlet ports 52, it serves only as adequate means for preventing the introduction of foreign particles into cap 26.

In the normal operation of the regulator, it is screwed onto valve tube 22, as shown in Fig. 2, to a point where depressor 34 engages valve plunger 32 to force the same inwardly and thereby open the valve core 30 to place the interior of the inflated article into communication with the regulator. Air will fill cavity 14, bore 38, grooves 44 and exert force against the underside of piston head 40. Spring 50 will prevent the escape of air by its lifting piston head 40 until such time as the pressure within the inflated article rises to a point where it overcomes the tension of spring 50.

When the pressure within the inflated article becomes great enough to lift the piston head 40 and compress spring 50, air will escape upwardly through notches 46 and into cavity 12. From this chamber the air will pass to atmosphere through outlet ports 52 until the pressure of the spring is again great enough to force piston head 40 against gasket 42 and again prevent the movement of air from within the inflated article.

Obviously, if the pressure at which air may escape through valve tube 22 is to be raised, then cap 26 is manually manipulated to compress spring 50 to the desired degree. Reversing the action so far as inflating cap 26 is concerned, will lower the pressure required to lift piston head 40 and permit the escape of air through valve tube 22.

The use of satisfactory and adequate indicia on cap 26 is contemplated but not here shown. Any suitable designation to teach the user at what pressure the regulator will release air through valve tube 22, may be supplied.

Manifestly, when the regulator is removed from its operative position on valve tube 22, plunger 32 will return to its normal place to close core 30 and prevent the accidental escape of air through the tube. When the regulator has been so removed, air may be introduced through valve tube 22 as is now the customary practice.

The regulator is not much larger than a conventional valve tube cap, its weight is negligible, and will not have a detrimental effect so far as its use on automobile tires is concerned. The regulator not only serves as a cap for tube 22, but as a means for insuring the tire against over inflation resulting in a blow-out when the temperature of the tire is raised due to atmospheric conditions or road friction.

The regulator may be made to present physical characteristics different from those above described and illustrated in the drawing, and therefore, it is desired to be limited only by the spirit of the invention and scope of the appended claim.

Having thus described the invention, what is claimed as new and desired to be secured by Letters Patent is:

A pressure regulator for inflatable bodies having a tire valve or the like, comprising a substantially tubular, unitary body having a partition provided with a central passage formed therethrough, said partition dividing the body into a first and a second cavity; an axially disposed despressor fitted into the passage and having a bore extending inwardly from one end thereof and radial passages in communication with the bore, said bore being in communication with the first cavity of the body at one side of the partition, said radial passages being in communication with the second cavity of the body at the opposite side of the partition; a reciprocable piston in the first cavity having external grooves formed therein and movable to and from a seated position on the partition; a cap on the body closing the outer end of the first cavity; and a spring in the first cavity between the piston and said cap, said cap having air outlet ports formed therein, said piston having a guide stem slidably extending into the bore of the despressor, said guide stem of the piston having external grooves formed therein for placing said bore of the compressor into communication with said first cavity of the body when said piston is moved from said seated position on the partition.

JOHN A. DE VILBISS.

REFERENCES CITED

The following references are of record in the file of this patent:

UNITED STATES PATENTS

| Number | Name | Date |
|---|---|---|
| 1,104,902 | Jarvis | July 28, 1914 |
| 1,156,328 | Thayer | Oct. 12, 1915 |
| 1,294,458 | Hayward | Feb. 18, 1919 |
| 1,315,173 | Wampler | Sept. 2, 1919 |
| 1,472,366 | Kelsey | Oct. 30, 1923 |
| 1,539,865 | Pratt | June 2, 1925 |
| 1,656,670 | Greenhouse | Jan. 17, 1938 |